United States Patent [19]

Stefik et al.

[11] Patent Number: 5,530,235

[45] Date of Patent: Jun. 25, 1996

[54] INTERACTIVE CONTENTS REVEALING STORAGE DEVICE

[75] Inventors: Mark J. Stefik, Woodside; Daniel G. Bobrow, Palo Alto; Stuart K. Card, Los Altos; Michalene M. Casey, Morgan Hill; Richard J. Goldstein, San Francisco, all of Calif.; Michael G. Lamming, Cambridge, England; Jock D. Mackinlay, San Jose, Calif.; Roy Want, Mountain View, Calif.; George G. Robertson, Foster City, Calif.; Mark D. Weiser; Daniel M. Russell, both of Palo Alto, Calif.

[73] Assignee: Xerox Corporation, Stamford, Conn.

[21] Appl. No.: 389,670

[22] Filed: Feb. 16, 1995

[51] Int. Cl.⁶ .................................................. G06K 19/06
[52] U.S. Cl. ........................ 235/492; 235/380; 235/487
[58] Field of Search ................................. 235/380, 487, 235/492

[56] References Cited

U.S. PATENT DOCUMENTS 4,614,861  9/1986  Paulov ..................................... 235/380
4,868,376  9/1989  Lessin et al. ........................... 235/492
5,183,404  2/1993  Aldous et al. ............................ 439/55

OTHER PUBLICATIONS

Robinson, E. J., "Redefining Mobile Computing," *PC Computing*, Jul., 1993, pp. 238–240, 247–248, and 252.
Abadi, M., Burrows, M., Kaufman, C., and Lampson, B., "Authentication and Delegation with Smart-cards," *Research Report DEC Systems Research Center*, 1990.

*Primary Examiner*—Harold Pitts
*Attorney, Agent, or Firm*—Richard B. Domingo

[57] ABSTRACT

A Document Card (DocuCard) for storing documents and which is content revealing. The DocuCard is a transportable unit having a nonvolatile storage means for storing information in a digital form, a control processor for processing user initiated functions; an I/O port for interfacing to external devices for reading and writing digital information, and a user interface for allowing a user to directly interact with the DocuCard. The user interface on the DocuCard includes a display for displaying lists of functions and documents and information responsive to user invoked functions and a user input portion for allowing a user to traverse the lists of functions and documents, as well as information generated responsive to an invoked function. The control processor of the present invention include features for controlling access to documents stored therein.

23 Claims, 10 Drawing Sheets

INTERACTIVE CONTENTS REVEALING STORAGE DEVICE

FIELD OF THE INVENTION

The present invention relates generally to the field of storage mediums, and in particular to transportable storage mediums for storing and retrieving documents.

BACKGROUND OF THE INVENTION

Digitally created works, for example music or software, are commonly distributed on a transportable storage medium such as an optically or magnetically encoded disk. Means for retrieving and interpreting the contents of the transportable storage medium are typically embodied in a playing/rendering device, e.g. a computer system or a Compact Disc Player. While such distribution of digital works is common, it is not ideal. A deficiency of transportable storage mediums is that they are not contents revealing. That is, the contents of the storage medium cannot be determined by merely looking at the storage medium. An example of a contents revealing storage medium is paper. Absent any encoding, by simply looking at the paper, its contents can be determined.

A simple way of identifying the contents of storage mediums, e.g. an optical or magnetic disk, is to affix a written label to the medium. Unfortunately, every time the disk is reused, the label must be updated or a new label created and and attached. It requires diligence to relabel floppy disks as they are used. Moreover, as storage capacity increases, a label big enough to list the entire contents may become impractical. In the case of optical disk medium, content information is typically printed onto the medium itself. This is satisfactory for the current state of optical disk technology since such disks typically cannot be reused. However, writeable optical disk products are now available. Such products will cause optical disks to have the same deficiencies as other storage mediums. Absent a label, the only way of verifying the contents of a transportable storage medium is to insert it into a suitable playing/rendering device and invoke commands to list the contents.

It is anticipated that the distribution of works in digital form will increase dramatically. For conservation and convenience reasons, it would be desirable to collect desired works on a personal transportable storage medium which is inherently contents revealing. Further, it would be desirable to perform basic storage management functions, such as deleting a file or organizing the content of the storage medium, without having to insert the storage medium into a playing/rendering device. This would enable a user to "make room" or organize the contents of the storage medium when necessary.

A technology which is related to the present invention is in the area of "smartcards". Smartcards are generally implemented to increase the convenience of performing various transactions, e.g. financial transactions. An example application of a smartcard would be as a smart financial services card. In such an application, the smartcard could provide Automatic Teller Machine (ATM) access as well as perform functions such as limiting the ATMs at which the card could be used and maintaining a record of ATM transactions. U.S. Pat. No. 4,868,376 to Lessin et al. entitled "Intelligent Portable Interactive Personal Data System" describes a smartcard having an alphanumeric keypad for user input, an alphanumeric display for displaying the results of various commands, a microprocessor, an operating system for controlling the smartcard, storage for storing one or more application programs and an Input/Output port for sending and receiving information. The smartcard described in Lessin et al. can be programmed for specific applications.

As noted above, smartcards have a focus that is primarily on enabling and/or recording certain transactions. As a result, their storage requirements are fairly modest. Known smartcard implementations are inadequate for use as a transportable storage medium due to their limited storage capacities.

A further related technology is for Personal Digital Assistants (PDAs), such as the Newton (TM) PDA, available from Apple Computer, Inc. of Cupertino, Calif. PDAs are typically portable computer systems, often characterized as having a "pen" based input device. PDAs are typically distributed with packages which perform various personal organization (e.g. calendering, address book) and communication (e.g. messaging) functions. Alternatively, PDAs can be programmed to perform desired applications.

Another related technology area is hardcards. Hardcards are storage medium such as a hard disk which is coupled to and packaged with a storage controller (rather than having separate controller and hard disk devices). The hardcard is then coupled to the computer system. Hardcards are typically used as a "permanent" storage medium which remains coupled to the computer system and are not meant to be transportable. Further, hardcards are not contents revealing.

SUMMARY OF THE INVENTION

A Document Card (hereinafter referred to as DocuCard) is disclosed. The DocuCard performs the function of a storage medium whose contents can be viewed and managed autonomously from a computer based system. In the currently preferred embodiment of the present invention, the DocuCard is a transportable unit having a nonvolatile storage means for storing information in a digital form; a control processor for processing user initiated functions and requests to access documents stored therein; an I/O port for interfacing to external devices for reading and writing digital information, and a user interface for allowing a user to directly interact with the DocuCard. The user interface comprising a plurality of traversal keys for allowing a user to traverse lists of functions and documents, a select key to allow a user to select highlighted functions or documents, a processing means for processing user invoked functions, and a display for displaying lists of functions and documents and information responsive to user invoked functions.

The currently preferred embodiment of a DocuCard is an instance of a repository, as defined in co-pending application entitled "System for Controlling the Distribution and Use of Digital Works", serial number not yet assigned, which is assigned to the assignee of the present invention and which is herein incorporated by reference. A repository is a device which enables access to documents through enforcement of usage rights which are attached to the documents. Usage rights define how and under what conditions a stored document may be used or distributed. For example, a user may request that a particular document be printed. The document cannot be printed unless it has an attached print right. A condition associated with the right may be that the document can only be printed once.

The user interface of the present invention enables a user to interact with a DocuCard to manage the contents contained therein, as well as to obtain Documents stored in other repositories.

The general steps for accessing a document stored in another repository comprising the steps of: coupling the DocuCard to said repository; displaying on the display of the DocuCard a list of functions for accessing a document stored in the repository, each of said functions representing an instance of how a selected document is used, each of said functions corresponding to an instance of a usage right; selecting a function from said displayed list of functions; displaying on the display of said DocuCard a list of the contents of the repository; selecting a desired document from the list of contents of the repository; the repository determining if the desired document has said instance of a usage right corresponding to the selected function; if the desired document has attached thereto the usage right corresponding to the selected function, the repository granting access to said document; and if the desired document does not have attached thereto the usage right corresponding to the selected function, the repository denying access to said document.

Because of the transportable nature of the DocuCard, it's size will be relatively small. Accordingly, the display size will be limited. It is typical that all of the functions for accessing a document cannot be present on the display at one time. The present invention provides a means for traversing the list of available functions. What will initially be displayed is a list of commonly used functions and one or more indicators to sub-lists of less frequently used functions. To find the desired function the user will: determine if the desired function is displayed; if the desired function is displayed, highlighting the function and selecting it; and if the desired function is not displayed, highlighting an indicator to sub-lists of less frequently used functions, selecting it and repeating until the function is displayed.

Similarly, it may not be possible to list all of the documents stored in a repository. Documents are stored in a hierarchical file system and in a lexical ordering. What is initially displayed is an indicator of lexical position within the repository at a current directory level and a list of documents. A user traverses the list using the traversal keys on the DocuCard until the desired Document is highlighted, wherein the select key is depressed.

DETAILED DESCRIPTION OF THE PREFERRED EMBODIMENTS

A Document Card (hereinafter referred to as DocuCard) for storing digital information (documents) and which is contents revealing is disclosed. A DocuCard is used for storing digital information which may be accessed by a system that is capable of playing or rendering the digital information, such as a computer system, digital copier, audio CD player and the like. Such systems are referred to herein collectively as rendering systems. A DocuCard is also used for obtaining documents from a repository of documents. An example of such a repository is a kiosk which is used for the secure distribution of documents.

The utility of a DocuCard can be viewed from varied perspectives. From one perspective, a DocuCard is an intelligent storage medium which enables a user to manage and view its contents in a standalone fashion. From a second perspective, the DocuCard is a secure repository of documents. A DocuCard implements the functionality of a repository as defined in the co-pending application entitled "System For Controlling the Distribution and Use of Digital Works", serial no. not yet assigned. Usage rights are attached to digital works and control how the digital work can be used or distributed, and are further used to specify any fees associated with use or distribution of digital works. When a repository receives a request to access a digital work, the repository examines the usage rights attached to the digital works to determine if access may be granted.

As used herein, the terms digital work and document are used interchangeably and refer to a work that has been reduced to a digital form. This would include any textual, audio or visual work, as well as to software programs.

Overview of a Physical Design of a DocuCard

Figure 1:
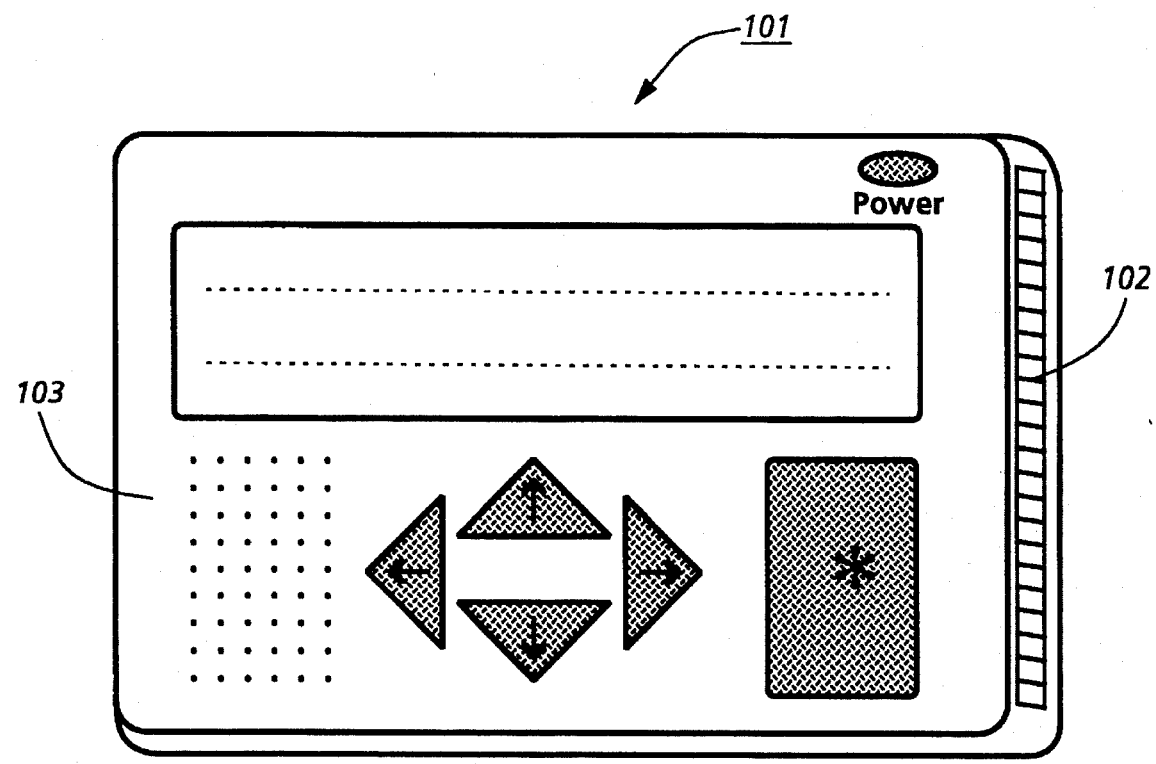
FIG. 1 is a perspective view of the currently preferred embodiment of a Document Card (DocuCard).

FIG. 1 is a perspective view of the currently preferred embodiment of a DocuCard. The DocuCard of the present invention is preferably implemented in accordance with standards promulgated by the Personal Computer Memory Card International Association (PCMCIA) of Sunnyvale, Calif. However, it would be apparent to one of skill in the art to implement the present invention having features different from the PCMCIA standard without departing from the spirit and scope of the present invention. In any event, the PCMCIA has defined an open standard for personal computer cards intended for use with portable computer systems. The standard can be used on any personal computer system supporting bus structures such as the Industry Standard Architecture (ISA) or Extended Industry Standard Architecture (EISA). PCMCIA cards are desirable because of their small size and support for plug and play applications (which means that the computer system will automatically recognize insertion of a card in a slot and enable its use). Utilization of such plug and play applications does require Basic Input/Output System (BIOS) and operating system level software coding. Specifications for designing products for support of PCMCIA cards and creating the requisite BIOS and operating system level software is available from the PCMCIA Headquarters, located in Sunnyvale Calif. Thus, no further discussion of PCMCIA and the attendant standards is deemed necessary.

Physically, the DocuCard is included in a housing 101 that is compliant with PCMCIA Type II or III standards. The physical dimensions of PCMCIA Type II or III compliant cards are 85.6 millimeters long, 54 millimeters wide with a thickness of 5.0 or 10.5 millimeters, respectively. The choice of Type II or III will depend on the desired storage capacity. The length and width are roughly the size of a credit card which makes it easily transportable. The PCMCIA standard further defines a signal protocol for communication between a PCMCIA device and a computer based system. Such communication is carried out through pins 102. On a "top" side of the currently preferred embodiment a user interaction area 103 is defined. The user interaction is comprised of a display, a plurality of buttons for scrolling, selection and entry of alphanumeric data and speaker for output of audio information. The user interaction area 103 of the currently preferred embodiment is described below with reference to FIG. 6.

Figure 2:
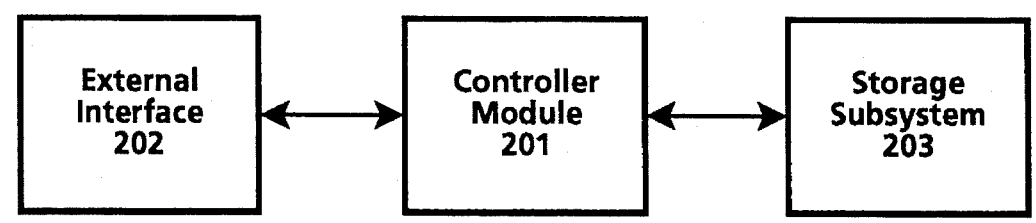
FIG. 2 is a block diagram of the operational components of a DocuCard.

The operational components of the DocuCard are described with reference to FIG. 2. Referring to FIG. 2, a controller module 201 provides the overall control function for the DocuCard. The controller module 201 may be implemented using a suitable controller integrated circuit chip (or chipset) such as a Motorola 6808 (available from Motorola Corporation of Chicago, Ill.) or an Intel 8051 (available from Intel Corporation of Santa Clara, Calif.). The controller module 201 may also be implemented using a general purpose microprocessor such as one of the members of the Intel X86 family of microprocessors. The controller module 201 further comprises a time keeping means or clock for maintaining a timebase for documents stored therein and an internal memory means (e.g. a Read Only Memory or ROM). The internal memory means contains programming instructions needed for carrying out the various DocuCard functions that are described herein.

The controller module 201 performs traditional disk controller functions (e.g. storage management, formatting, etc.) as well as processing in response to user initiated functions. Such user initiated functions will be described in further detail below. The controller module 201 may also be used to perform additional functions as needed, such as data encryption/decryption, or data compression/decompression. Finally, the controller module 201 enforces usage rights attached to documents, initiation of usage fee transactions, and controls the DocuCard User Interface.

An external interface 202 enables the DocuCard to be in communications with another repository or to a rendering system. Communications to external system in the currently preferred embodiment is through well known networking protocols. However, the protocol by which documents are stored and accessed are transport layer independent. So for example, the DocuCard may look to the coupled computer system as if it were networked attached via a TCP/IP session while the actual exchange of documents may be enabled using a higher level protocol.

The controller 201 manages access to storage subsystem 203. The storage subsystem 203 is comprised of two distinct parts. A first part residing on a low power nonvolatile solid state memory will contain the directory structure for the storage system. Use of a low power solid state memory in part enables the performance of the standalone functions under battery power of a DocuCard that are described herein. The directory structure would include the description file, which is described in greater detail below, for each of the documents stored in the DocuCard. The first part is readily accessible to the controller 201 to facilitate quick display of the DocuCard directory on the DocuCard display. A second part resides on a high capacity storage medium and will contain the digitally encoded contents of each of the documents. Suitable high capacity storage mediums would be magnetic or optical disks or a nonvolatile solid state memory. Partitioning of the data in this manner reduces memory and power requirements for viewing the contents of the DocuCard when operating in standalone mode. The manner in which documents are organized in the currently preferred embodiment is described in more detail below.

Although not illustrated, a DocuCard may also have stored within it a credit server for reporting usage fees that are associated with the access to a document.

The list of operational components described herein is not meant to be exhaustive. DocuCards will typically be implemented in accordance with the desired functionality and the type of documents that it will support.

DocuCard Coupling

The repositories and rendering systems to which a DocuCard may interface would fulfill the functional requirements as defined in the aforementioned "System For Controlling The Distribution and Use of Digital Works" application. For a direct coupling, the repository or rendering system would typically have at least one PCMCIA compliant slot. So for the electrical connection to occur, the DocuCard is merely inserted into the PCMCIA slot.

Further, as mentioned above, a DocuCard may also couple to another DocuCard. Such coupling would occur via a mating interface device which would electrically connect the PCMCIA external interfaces of the respective DocuCards.

Figure 3:
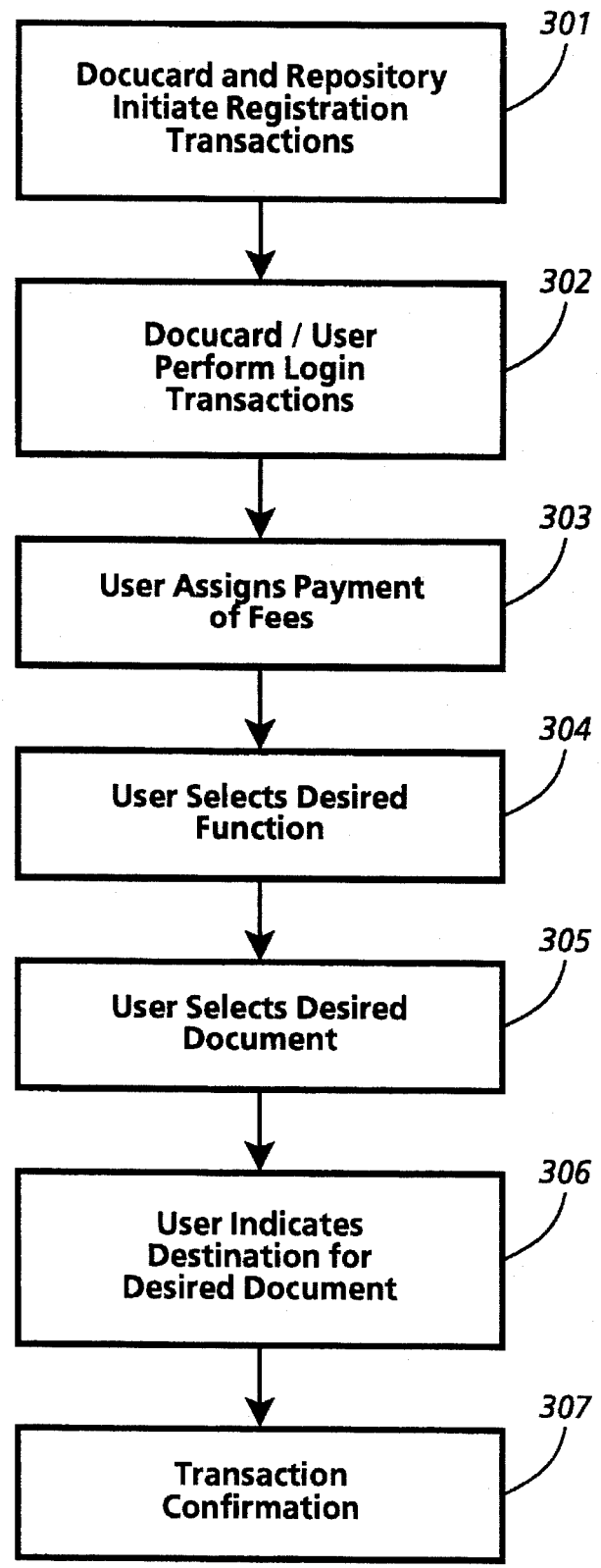
FIG. 3 is a flowchart describing the interaction between a DocuCard and a repository in the course of accessing a document stored in the repository as may be performed in the currently preferred embodiment of the present invention.

FIG. 3 is a flowchart describing the interaction between a DocuCard anti a repository in the course of accessing a document stored in the repository. Referring to FIG. 3, the DocuCard and repository initiate registration transactions, step 301. Registration is a process by which two repositories establish a secure and trusted session. By secure and trusted it is meant that the session is reasonably safe from intrusion and that the respective repositories have established themselves as bona fide (i.e. not an intruder). The registration process is automatic and is triggered by the establishment of the electrical connection between the DocuCard and repository. The steps performed during registration as may be used in the currently preferred embodiment is described in the aforementioned co-pending application entitled "System For Controlling the Distribution and Use of Digital Works."

Following the registration transaction, a Login transaction is performed, step 302. A Login transaction is the process by which a user logs onto a repository, typically by entering a Personal Identification Number (PIN). In this case, the user of the DocuCard is logging onto the DocuCard. This logging in process may also activate credit accounts.

The user on the DocuCard now uses the user interface to assign payment of any fees associated with the transaction to be executed, step 303. The fees may be assigned to either the user of the DocuCard or to the owner of the repository. Of course the acceptance of fees by the repository may be a prerequisite to the continuation of the process.

Now, the user of the DocuCard selects the desired function for obtaining the document, step 304. The particular function will correspond to a particular usage right and indicates how the user wishes to use the document. A list of available documents on the repository is then presented wherein the user selects the desired document, step 305 and the destination where the document is to be placed, step 306. The DocuCard will then present the transaction for confirmation, step 307 where it can be confirmed or rejected.

The steps for selection of documents and functions is part of the user interface of the present invention and are described in greater detail below.

Organization and Representation of Documents In A DocuCard

In the currently preferred embodiment, documents are stored in a hierarchical file system. Organization of documents in a hierarchical file system is well known in the art but is briefly described herein. Documents are stored within directories. Directories and subdirectories are comprised of a collection of documents and/or subdirectories. The contents of a directory or subdirectory are organized for display in alphabetical order. Documents will have types for identifying document properties. It is worth noting that it would be apparent to one skilled in the art to store digital data in other types of organizational structures, e.g. hyper-linked or as a flat directory. Implementations incorporating other organizational structures would not depart from the spirit and scope of the present invention.

The file information for a document is comprised of a "contents file" and a "description file." The contents file is stored independently from the description file. The "contents" file is a stream of addressable bytes whose format depends completely on the computer based system used to play, display or print the document. The description file contains the usage rights for the document and a pointer to the document in the content part. For composite documents comprised of multiple individual digital works, the description part is an acyclic structure (e.g. a tree structure) wherein each node corresponds to one or more of the multiple individual digital works.

Figure 4:
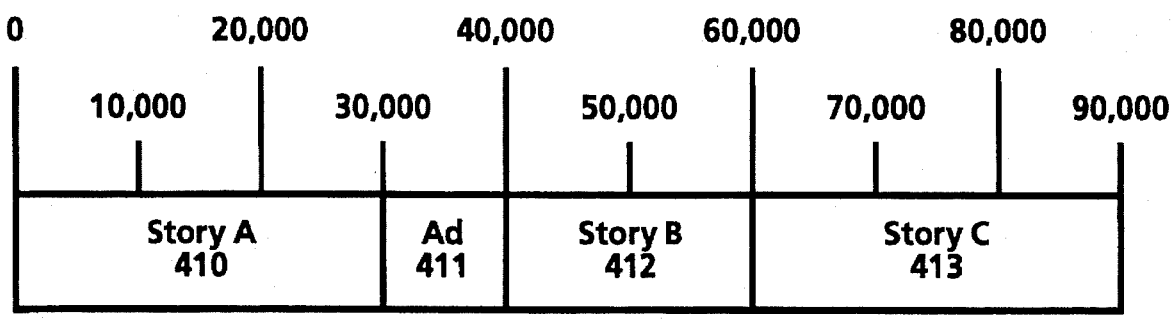
FIG. 4 illustrates a contents file portion of a document representation for a document stored on a DocuCard of the currently preferred embodiment of the present invention.

FIG. 4 illustrates the layout of a contents file. Referring to FIG. 4, a digital work 409 is comprised of story A 410, advertisement 411, story B 412 and story C 413. It is assumed that the digital work is stored starting at a relative address of 0. Each of the parts of the digital work are stored linearly so that story A 410 is stored at approximately addresses 0–30,000, advertisement 411 at addresses 30,001–40,000, story B 412 at addresses 40,001–60,000 and story C 413 at addresses 60,001–85 K. Note that the data in the contents file may be compressed (for saving storage) or encrypted (for security).

Figure 5A:
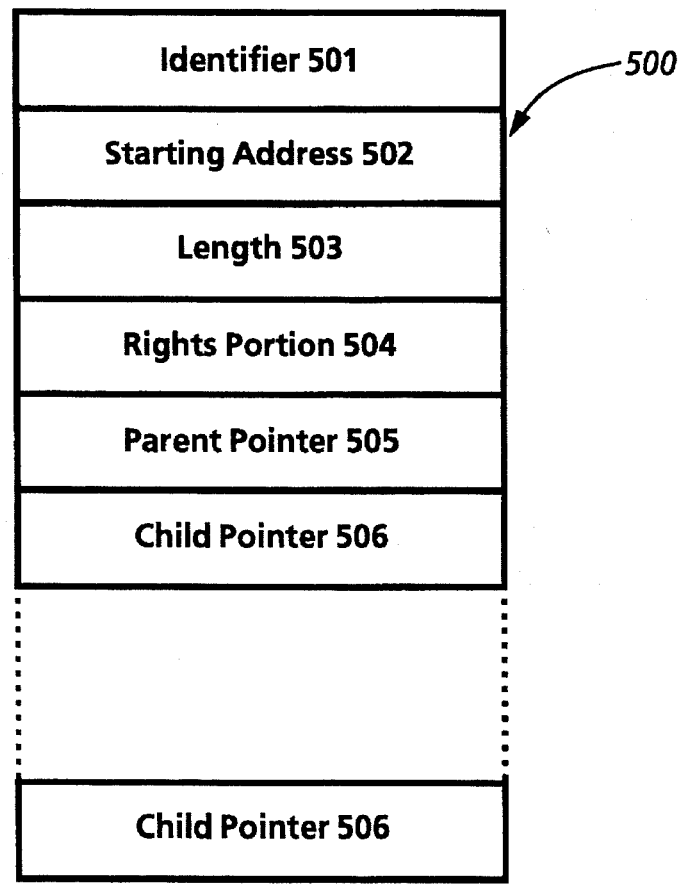
FIGS. 5a and 5b illustrates a description block and a description tree portion for the document representation of the contents file illustrated in FIG. 4.

From FIG. 4 it is readily observed that a digital work can be represented by its component parts as a hierarchy. The description tree for a digital work is comprised of a set of related descriptor blocks (d-blocks). The contents of each d-block is described with respect to FIG. 5a. Referring to FIG. 5a, a d-block 500 includes an identifier 501 which is a unique identifier for the work in the repository, a starting address 502 providing the start address of the first byte of the work, a length 503 giving the number of bytes in the work, a rights portion 504 wherein the granted usage rights and their status data are maintained, a parent pointer 505 for pointing to a parent d-block and child pointers 506 for pointing to the child d-blocks In the currently preferred embodiment, the identifier 501 has two parts. The first part is a unique number assigned to the DocuCard upon manufacture. The second part is a unique number assigned to the work upon creation. The rights portion 504 will contain a data structure, such as a look-up table, wherein the various information associated with a right is maintained. The information required by the respective usage rights is described in more detail below. D-blocks form a strict hierarchy. The top d-block of a work has no parent; all other d-blocks have one parent.

Each d-block may further contain a document thumbnail or a pointer to a document thumbnail. The document thumbnail is a fixed representation of the document. In some instances the document thumbnail is a textual description. In other instances the document thumbnail is pictorial representation (for documents comprised of video data, the thumbnail could be one or more video frames) or an audio clip (for documents comprised of audio information). In any event, the thumbnail will convey the essence of the content of the corresponding document. It should be noted that each of the subdocuments has associated with it a thumbnail. However, it would be apparent to one skilled in the art to only provide a thumbnail for the main document. Further, it should be noted that visual thumbnails would preferably be stored in some compressed image format (e.g. MPEG, JPEG or run-length encoded). Accordingly, the display of the thumbnail would require that the DocuCard display have at least a portion of which is bit-mapped.

Figure 5B:
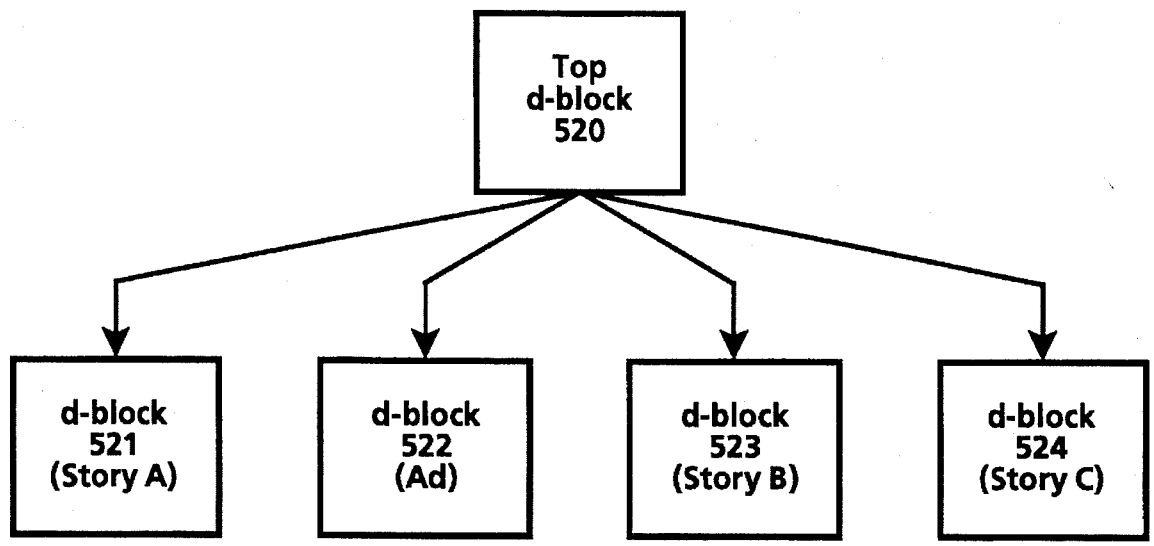

FIG. 5b illustrates a description tree for the digital work of FIG. 4. Referring to FIG. 5b, a top d-block 520 for the digital work points to the various stories and advertisements contained therein. Here, the top d-block 520 points to d-block 521 (representing story A 410), d-block 522 (representing the advertisement 411), d-block 523 (representing story B 412) and and d-block 524 (representing story C 413).

DocuCard User Interface

Figure 6:
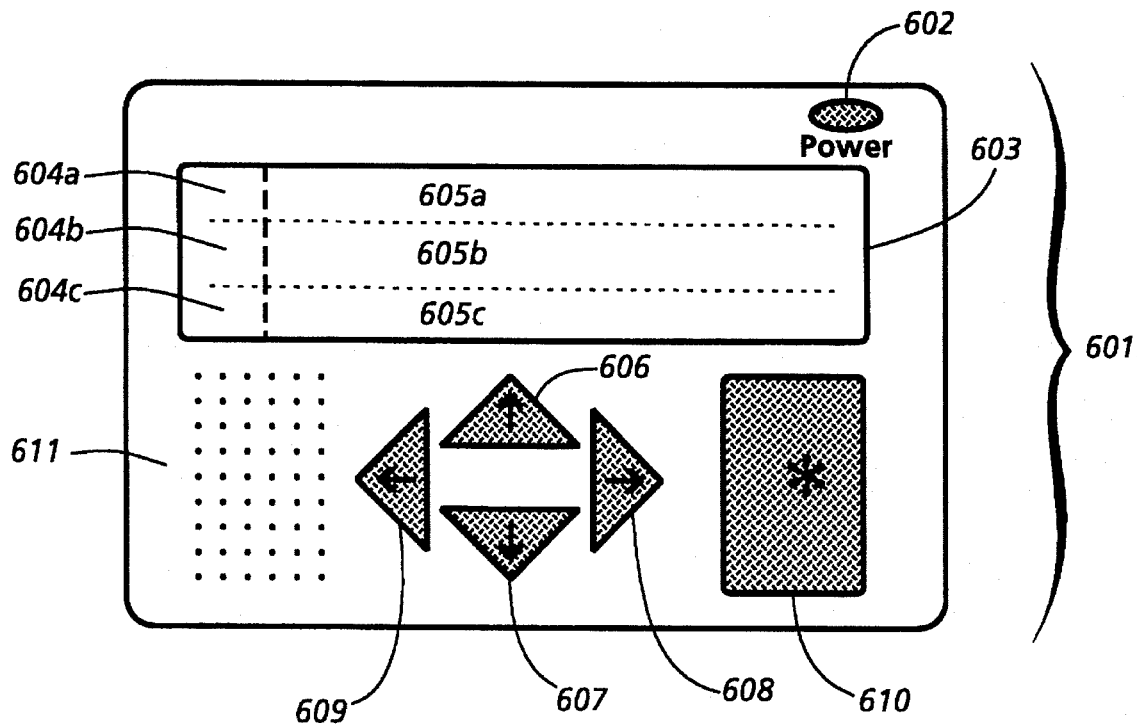
FIG. 6 is a detailed illustration of the user interaction area of a DocuCard in the currently preferred embodiment of the present invention.

The user interface enables a user to direct the DocuCard to access documents stored in a repository and to manage the contents of the DocuCard. The user interface is comprised of a plurality of switches for entering input, a display for presenting information and predetermined and programmed sequences of steps for carrying out the various operations. FIG. 6 illustrates in greater detail the user interaction area for a DocuCard in the currently preferred embodiment. Referring to FIG. 6, the user interaction area 601 takes up substantially one side of the DocuCard housing. A button 602 is used for turning on and off battery power to the DocuCard. A display area 603 is comprised of three (3) lines. Each of the three lines is capable of displaying an icon in the first position (604a–604c, respectively) and 15–16 characters after it (605a–605c, respectively). Each of the areas 605a–605c is a segment display. The areas 604a–604c may be either a small bitmap display or a segment display (where the icons are designed to use a limited set of segments). A suitable display for display area 603 is one that has low power consumption. Construction of such displays is well known in the art, so no further description of a low power display is deemed necessary.

Figure 7:
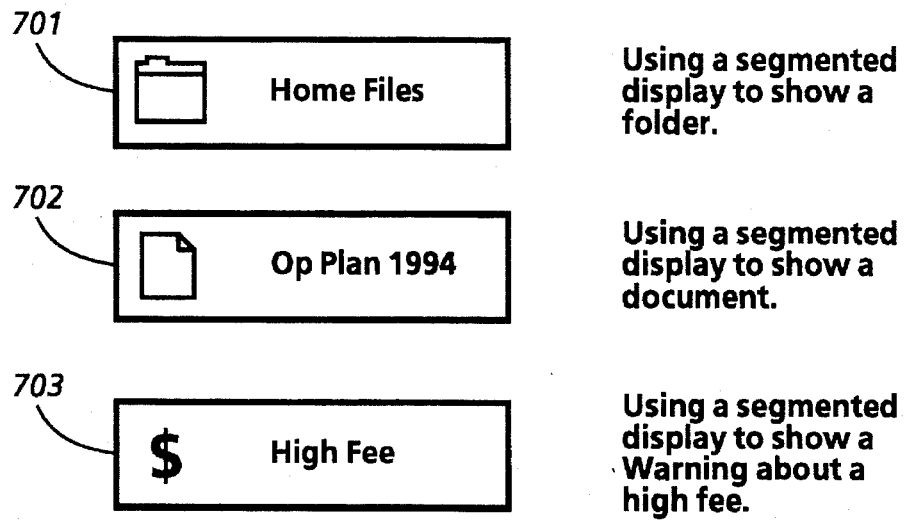
FIG. 7 illustrates different forms of information provided on a DocuCard display in the currently preferred embodiment of the present invention.

FIG. 7 shows various examples of a line on the display area 602. Referring to FIG. 7, line 701 illustrates a directory where the icon representing the directory is a file folder (a common metaphor for a directory) and the text portion identifies the directory as "Home Files". Line 702 illustrates a document where the icon representing the document is a sheet with a folded corner and the text portion identifies the document as "Op Plan 1994". Note that each document type would preferably have its own icon to allow a user to quickly visibly scan the document information to determine if it is of the type that they are searching for. The display area 603 may also be used to indicate the status of a transaction and error or warning messages. Line 703 of FIG. 7 illustrates a warning message being displayed indicating that a transaction being executed has a high cost.

Referring back to FIG. 6, directional arrow keys 606–609 are used for controlling motion of a cursor along and between the lines 605a–605c of the display 603. Such motion allows for traversal among the items on the display 603. Key 606 is referred to as the "up-arrow" key and provides for moving the cursor up one line. Key 607 is referred to as the "down-arrow" key, and provides for moving the cursor down one line. Key 608 is referred to as the "left-arrow" key and provides for moving the cursor left along a line. Key 609 is referred to as the "right-arrow" key and provides for moving the cursor right along a line. Operationally, the left arrow key 608 and right arrow key 609 will move a single character (or item) position if pressed only once. If held down, the cursor will move multiple positions (with increasing speed as the key is held down).

It should also be noted that the directional arrow keys 606–609 may be used to enter private identification data (for use analogous to a Private Identification Number). As will be seen in alternative embodiments illustrated below, a DocuCard may also include a numeric keypad for entry of a Private Identification Number.

The directional arrow keys 606–609 may also be used for enabling scrolling through thumbnails of documents.

Button 610 is referred to as the "select" key. When the select key 610 is pressed, the desired transaction (e.g. copying of files or entering of text) is selected and carried out. Such operation is roughly analogous to the enter key on a computer terminal keyboard.

Finally, the user interaction area 601 includes an area 611 for placement of a speaker for the output of audio information. A suitable speaker to be utilized would have low power consumption. Construction of such low powered speakers is well known in the art.

Figure 8:
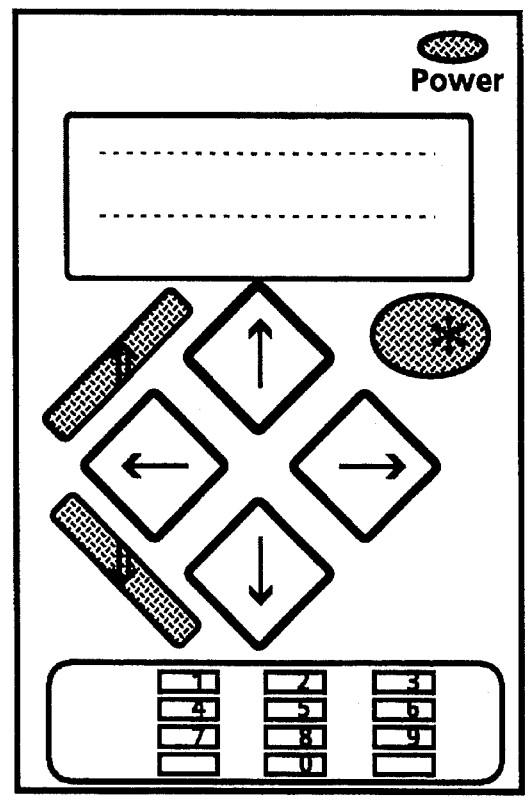
FIGS. 8–11 illustrate various alternative embodiments of a user interaction area having different key arrangements.
Figure 9:
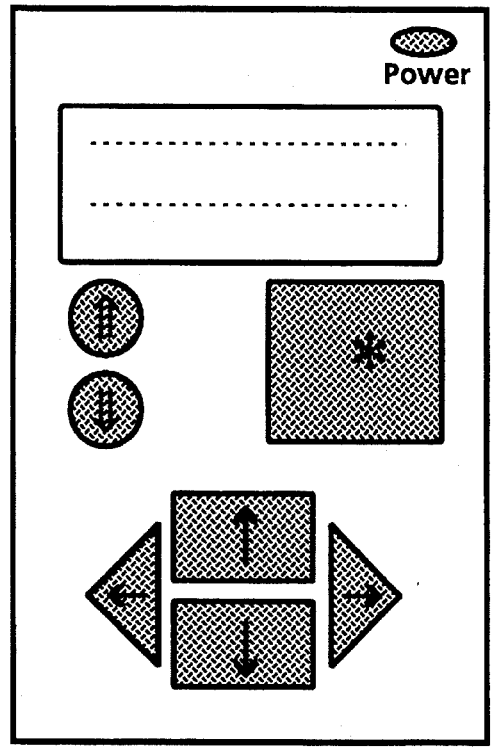
Figure 10:
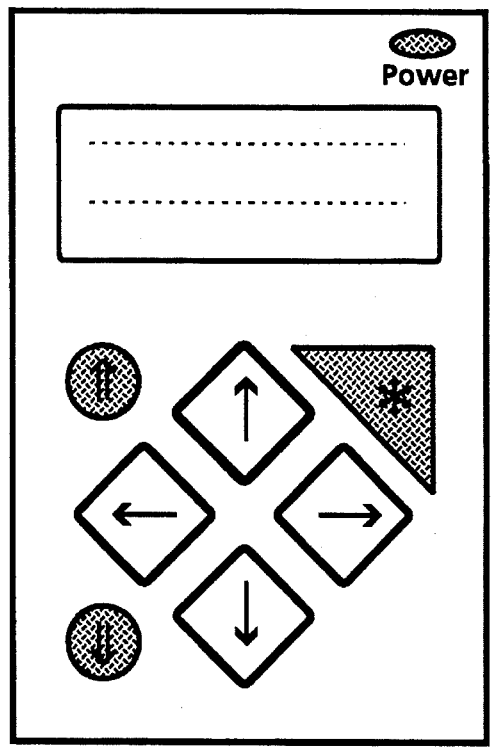
Figure 11:
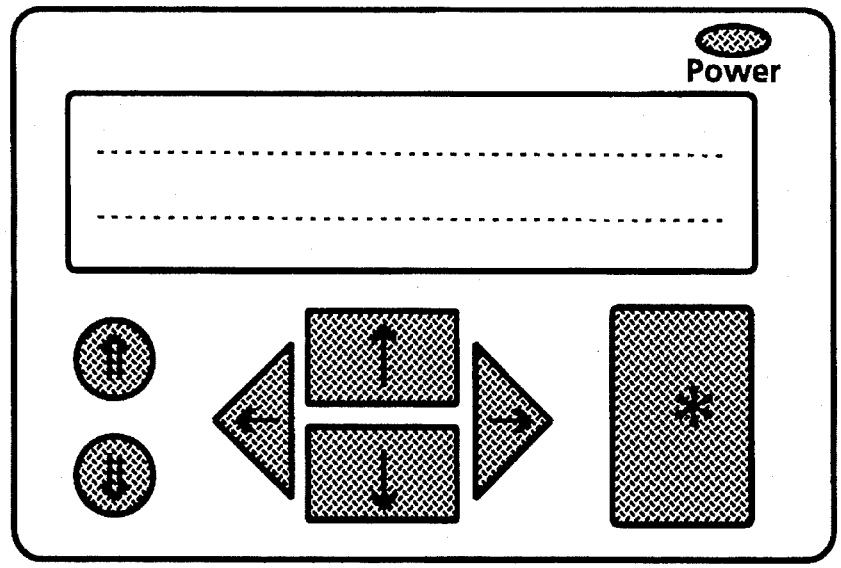

Various layouts of the User Interaction area and shapes of the keys may be implemented. Each of the new layouts include a key for traversing directories (these have been eliminated above and are implemented by double-clicking the up and down arrow keys). FIGS. 8–10 have the display running the "short" dimension of the user interaction area. This reduces the display area, but increases the area for key placement. FIG. 8 illustrates a numeric keypad on the front top surface and the keys having different shapes. FIGS. 9–10 are layouts where the numeric keypad would be on the opposite side of the DocuCard. The layout of FIG. 11, is similar to the currently preferred embodiment, but with different sized keys and the elimination of the speaker area.

Although not illustrated, another implementation of the DocuCard User Interaction Area would have a display area taking up one entire side of the DocuCard, with the various keys being positioned along the sides or on the reverse side. As noted above DocuCards may be implemented having fewer functions and may not require various user interface features described herein.

Selecting a Function

Figure 12:
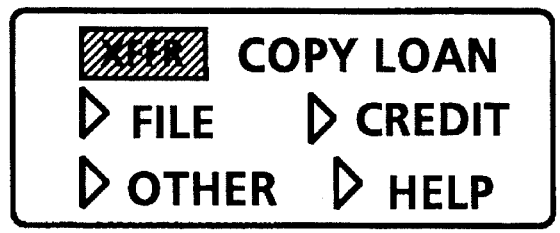
FIG. 12 is an illustration of the display area displaying a function selection interface as may be used in the currently preferred embodiment of the present invention.

When a user presses the "Power" key, the display area will show a function selection interface as illustrated in FIG. 12. Referring to FIG. 12, both specific functions and function classes are displayed. Function classes are distinguished by the arrowhead preceding the name of the class. The first line of the display indicates three functions, "XFER COPY LOAN". The second line indicates function classes "FILE" and "CREDIT". The third line indicates function classes "OTHER" and "HELP".

A "current" function capable of being selected is indicated by highlighting using reverse video, underlining or some other technique. Traversal is accomplished by using the "up-arrow" and "down-arrow" keys to go between the lines and the "left-arrow" and "right-arrow" keys to go across a line. Referring to FIG. 12, the XFER function is highlighted so that it is current and can be selected.

Figure 13:
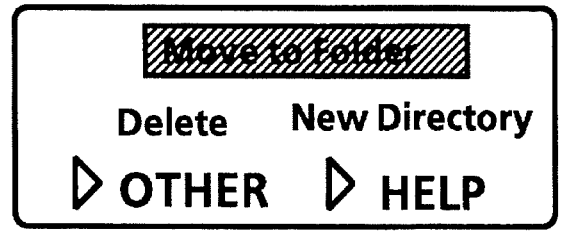
FIG. 13 is an illustration of the display area when a function group has been selected and the user is presented with the particular functions within the group.

FIG. 13 illustrates what occurs when a function class is selected. Here it is assumed that the "FILE" function class is current. The "FILE" function class is selected by pressing the "down-directory arrow" key (or by double-clicking the "down-arrow" key). What is then displayed are the most commonly used functions of the class, "Move to Folder", "Delete" and "New Folder" as well as an "OTHER" indicator to denote other functions that can be displayed that fall within the same general function class designation. Other functions may include functions for making a back-up copy or changing directory information. Moving out of this function class would be accomplished by pressing the "up-directory arrow" key (or by double clicking the "up-arrow" key).

Selection of the "current" function is accomplished by depressing the "Select" key.

The DocuCard functions of the currently preferred embodiment are listed in Table A.

Selecting a Document

Figure 14:
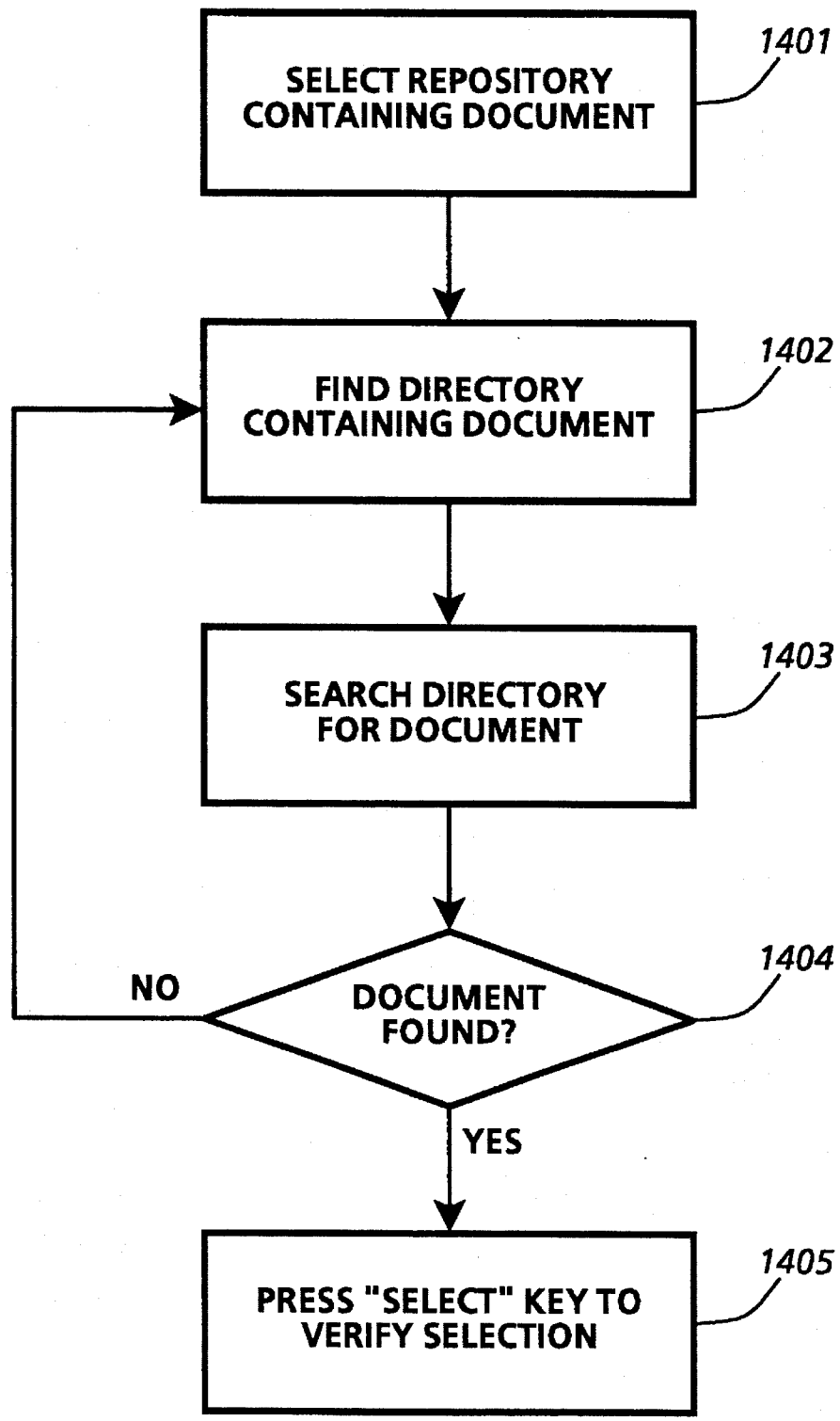
FIG. 14 is a flowchart illustrating the steps performed for selection of a document or directory in the currently preferred embodiment of the present invention.
Figure 15:
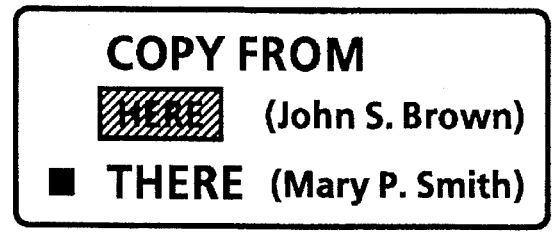
FIGS. 15–17 are illustrations of the display area for document or directory selection in the currently preferred embodiment of the present invention.

As noted with respect to FIG. 3, once a function has been selected, the document on which the function is to be performed is selected (except for certain file management functions). The present invention provides a consistent interface for the selection of a document across the various functions. The steps for selection of a document are described with respect to the flowchart of FIG. 14 and exemplified for a COPY function in the screen displays of FIGS. 15–17. Referring to FIG. 14, after a function is selected, the user selects the repository containing the document on which the function will be performed, step 1401. Referring now to FIG. 15, the Copy function has been selected and the information illustrated in FIG. 15 is displayed. The first line displays "COPY FROM" to indicate the repository from which the document is copied is to be selected. The second and third lines of the display list the repositories. The second line containing "HERE" indicates the DocuCard while the third line containing "THERE" indicates the connected repository. Note that if the DocuCard was not connected to another repository or if the other repository did not permit copying, this dialog in the COPY function may not be needed. In any event,

TABLE A

DOCUCARD FUNCTIONS

| Function (Class) | Description |
| --- | --- |
| TRANSFER (XFER) | Move a document from a source repository to a destination repository. |
| COPY | Make a copy of a document from a source repository to a specified location in a destination repository. |
| LOAN | Make a copy of a document from a source respository which is accessible on the destination repository for a predetermined period time (i.e. the loan period). |
| MOVE TO FOLDER (FILE) | Move a document to a selected folder in the DocuCard. |
| DELETE (FILE) | Remove a document from the DocuCard. |
| NEW FOLDER (FILE) | Create a new folder on the DocuCard. |
| BACK-UP (FILE) | Create a back-up copy of a document on the DocuCard on another repository. |
| RESTORE (FILE) | Restore a back-up copy made on another repository to the DocuCard. |
| DIRECTORY | Display the contents of a folder on the Docu-Card or in a folder on a coupled repository. |
| PRINT | Print a document on a printer attached to the DocuCard. |
| PLAY | Play a document on a playback device coupled to the DocuCard. |
| ASSIGN FEE (CREDIT) | Specify the payor of a usage fee. |
| HELP | Provides context sensitive help instructions. | presuming a choice must be made, the user would then use the up-arrow and down-arrow keys to move the cursor to the line corresponding to the desired repository. The selected repository is highlighted.

Figure 16:
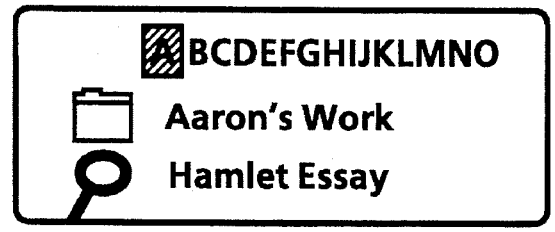

Referring back to FIG. 14, when the repository has been selected, the user searches for the document through the hierarchical directory structure of the repository. This begins with finding the desired directory, step 1402. The DocuCard display area will display the information illustrated in FIG. 16. Referring to FIG. 16, the first line shows the characters of the alphabet. A highlighted letter will indicate where the search is positioned (recall the alphabetical ordering of the directories/documents). The second line indicates the current directory being searched and the third line indicates a particular item within the directory (an item being either a document or sub-directory). In FIG. 16, the search position is located at documents or directories beginning with the letter A. The currently selected folder is named "Aaron's Work" and the first file inside the folder is named "Hamlet Essay".

Figure 17:
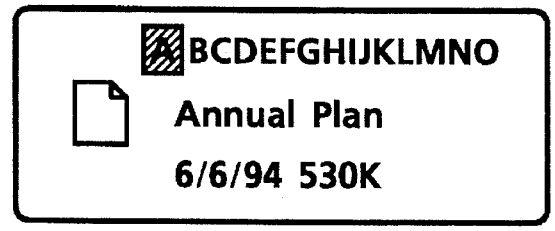

A user will then search the directory using the search keys to find the desired directory. Note that the user changes a directory being searched by using the "move-down" key to search a sub-directory and the "move-up" key to enter a parent directory. When a user presses the right arrow key, the search will proceed down the lexical ordering (i.e. in the A-Z direction). When a user presses the left arrow key, the search will proceed up the lexical ordering (i.e. in the Z-A direction.) Note that as the directional arrow key is held down, the search speed will increase. When a desired directory is found, the directory is searched to determine if the desired document is there, step 1403. This is accomplished by invoking the "move-down" key to enter the directory. The directory is scanned by pressing the left and right arrow keys to go through the lexical ordering of files. FIG. 17 illustrates a display of an entry in a directory. As before, the first line contains the alphabet which can be be scanned as described above. The second line shows the name of the entry and the third line provides information about the entry. In FIG. 17, A document entitled "Annual Plan" which was created on Jun. 6, 1994 and has a size of 530 Kilobytes is selected.

It is then determined if the desired document is in the directory, step 1404. If the desired document is in the directory, the search is completed and the user presses the "select" key to confirm selection, step 1405. If not, the user would then go to another directory to find the documents as described with respect to steps 1402 and 1403.

Entering Text

Figure 18:
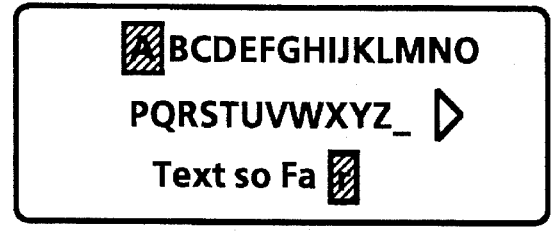
FIG. 18 is an illustration of the display area for entering text in the currently preferred embodiment of the present invention.

There may be instances where text will be entered, e.g. for the name of a created folder. A "character selection" technique for entering text is illustrated with reference to FIG. 18. Referring to FIG. 18, the first and second lines indicate the characters that can be selected. The third line is a buffer, showing the text that has been entered so far. In the first two lines, highlighting indicates what character has been selected. In the third line, the highlighting indicates where the next character of text will appear. Traversal between the lines is accomplished using the "up-arrow" and "down-arrow" keys. The "left arrow" and "right arrow" keys provide for traversing a particular characters on a line. Selection of characters occurs by depressing the "select" key, which will cause the selected character to be displayed on the third line at the next (right most) character position.

When in the buffer area of line three, characters are deleted by moving the "left-arrow" key over the character position. Text is entered and deleted a character at a time. To cause the entered text to be used, the bottom line is selected using the "down arrow" key and the "select" key depressed.

Various schemes for entering text data from a numeric keypad (e.g. a telephone keypad) are known and would be suitable for use in the present invention.

Functional Examples

What follows are two examples of DocuCard functions and how they would be carried out. It should be noted that other functions in the currently preferred embodiment would be carried out in a similar manner.

Copying a Document

Figure 19:
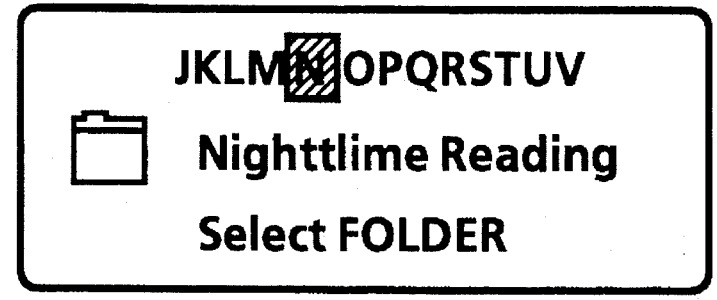
FIGS. 19–21 are illustrations of the display area for a COPY function transaction as may be performed in the currently preferred embodiment of the present invention.

It is assumed that a user has selected a document (or directory) for copying as described above. The next step is to identify where the document will be copied to. The last location to which a copy operation has been performed is immediately presented to the user as a default. If this is the same location to copy to, the user simply presses the "select" key to initiate the copy. Otherwise, the user must select a destination directory. Selection of the destination directory is performed in a manner similar to selection of a document. A screen display for choosing the destination directory is illustrated in FIG. 19. As before, the first line has the alphabet to indicate the lexical position and the second line the name of the currently selected directory. The third line provides an indication of the step in the function that is being performed in terms of instructions to the user. When the desired directory is selected, the "select" key is depressed.

Figure 20:
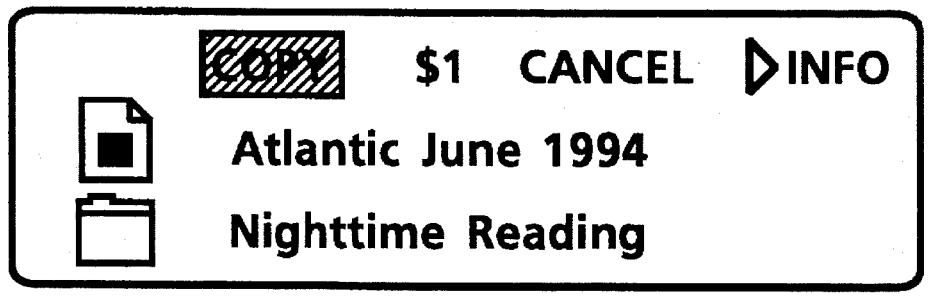

Once the destination directory is selected, a function confirmation and summary is displayed as illustrated in FIG. 20. Here, the First line indicates that it is a "COPY" function that will cost $1.00 (One dollar) to perform. The first line further contains an option to "CANCEL" the function and an "INFO" indicator that can be selected to get other information about the transaction. The second line of the display indicates the document being copied and the third line of the display indicates the destination directory.

Figure 21:
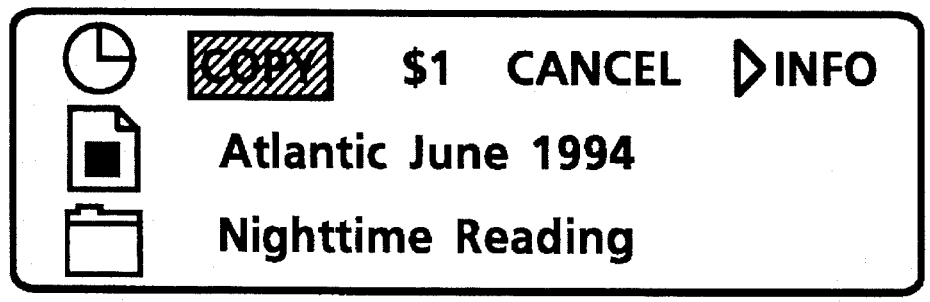

FIG. 21 illustrates a warning message being displayed as part of the transaction summary. Here, the clock on the first line could be flashing to indicate some warning about the transaction (e.g. that the copy may be only used for some limited amount of time.) The user would select the "INFO" option to get information about the warning.

When the user is ready to perform the transaction, the "select" key is pressed when in the confirmation/summary display of FIG. 20.

Organizing A Directory

A DocuCard may contain a single document or thousands of documents. It is clearly desirable to be able to organize the documents. As described, the documents in a DocuCard are organized in hierarchical directories. So the steps in organizing a directory would be to make an instance of a directory and to move documents and directories into the created directory. From the previous discussion of selecting a function described with respect to FIG. 13 it is observed that the NEW Directory function is found in the FILE function group. Accordingly, the user will select the NEW Directory function in the manner described above with respect to Selecting a Function. The user will then be asked to identify the repository to which the new directory will be created and to provide a name for the new directory. Once a name is provided, the user will be asked to identify the directory in which the new directory will be created. The steps and information display are similar to those described above with respect to the COPY function. Providing a name would be accomplished in the manner described above with respect to entering text.

Once the directory is created, documents (and other directories) can be mowed into it. This is accomplished by the Move to Folder function. As we can see from FIG. 13, the Move to Folder function is also contained in the FILES function group. At this point the user needs to select two arguments: the item to be moved and the directory into which it is to be moved. Selection of the item to be moved and the destination directory is as described in the steps performed in the COPY function. Again, a summarization display is presented to the user where they can decide to cancel or complete the transaction by depressing the "select" key.

Thus, a DocuCard is disclosed. While the present invention is described with respect to a preferred embodiment, it would be apparent to one skilled in the art to practice the present invention with other storage, display, user interface or packaging technologies. Such alternative embodiments would not cause departure from the spirit and scope of the present invention.

What is claimed:

1. A transportable storage device for storing digital documents, said transportable storage device for exchanging documents with a repository, said repository storing documents having attached usage rights, said transportable storage device comprising:

a rigid enclosure having a top surface and a bottom surface, said top surface defining a first aperture;

a storage means positioned within said rigid enclosure, said storage means for storing documents having attached usage rights;

a power source for providing power to enable standalone operation of said transportable storage device;

an external interface extending through said rigid enclosure, said external interface for coupling to another repository;

a controller module positioned within said rigid enclosure, said controller module comprising:
   access control means for controlling access to documents stored in said storage means;
   function processing means for performing functions responsive to user selections entered on a user interface; and
   registration means for creating a trusted session with said repository through said external interface; and said user interface comprising:
   a display means positioned in said first aperture of said top surface, said display means for displaying a function list and a document list identifying documents stored in said storage means;
   selection means coupled to said controller means, said selection means for enabling a user to find and select functions from said function list and documents from said document list.

2. The transportable storage device as recited in claim 1 wherein said storage means is further comprised of a read/write means and a storage medium, said read/write means for reading data signals from and writing data signals to said storage medium, and said storage medium for recording said data signals.

3. The transportable storage medium device as recited in claim 2 wherein said storage medium is a magnetic disk.

4. The transportable storage device as recited in claim 2 wherein said storage medium is an optical disk.

5. The transportable storage device as recited in claim 2 wherein said storage medium is a plurality of solid state memories.

6. The transportable storage device as recited in claim 1 wherein said top surface of said rigid enclosure further defines a plurality of second apertures and said selection means is comprised of a plurality of switches positioned to extend through said plurality of second apertures of said top surface of said rigid enclosure.

7. The transportable storage device as recited in claim 6 wherein said plurality of switches is comprised of: a set of traversal switches for traversing a function list and a document list, a selection switch for selecting a function or a document and a power switch for enabling a power source to activate said transportable storage device.

8. The transportable storage device as recited in claim 7 wherein said user interface is further comprised of means for entering textual information using said set of traversal switches and said selection switch.

9. The transportable storage device as recited in claim 6 wherein said display means is comprised of a segment display.

10. The transportable storage device as recited in claim 1 wherein said display means is a touch screen display and said selection means is a plurality of touch screen buttons defined on said touch screen display.

11. The transportable storage device as recited in claim 1 wherein said external interface means is compliant with Personal Computer Memory Card Industry Association standards.

12. The transportable storage device as recited in claim 1 wherein said function list comprises a first function to view document identifiers of the documents stored in said storage means and a second function to delete a document stored in said storage means.

13. The transportable storage device as recited in claim 1 wherein said access control means of said controller module is further comprised of a means for enforcing usage rights attached to documents.

14. The transportable storage device as recited in claim 13 wherein said controller module is further comprised of means for reporting usage fees attached to documents for access to such documents.

15. The transportable storage device as recited in claim 1 wherein said bottom surface of said rigid enclosure defines a plurality of second apertures and said selection means is comprised of a plurality of switches positioned to extend through said plurality of second apertures of said bottom surface of said rigid enclosure.

16. The transportable storage device as recited in claim 1 wherein said top surface and said bottom surface of said rigid enclosure define a plurality of edges, said plurality of edges defining a plurality of second apertures and said selection means is comprised of a plurality of switches positioned to extend through said plurality of second apertures of said plurality of edges.

17. A method for accessing documents stored in a repository from a DocuCard, said documents stored in said repository having one or more usage rights attached thereto, said usage rights indicating a particular manner by which said document may be used, said DocuCard comprised of a display, a plurality of traversal keys and a select key, said method comprising the steps of:

a) a user coupling said DocuCard to said repository;

b) displaying on said display of said DocuCard a list of functions for accessing a document stored on said repository, each of said functions representing an instance of how a selected document is used, each of said functions corresponding to an instance of a usage right;

c) said user selecting a function from said displayed list of functions;

d) displaying on said display of said DocuCard a list of the contents of said repository;

e) said user selecting a desired document from said list of contents of said repository;

f) said repository determining if said desired document has said instance of a usage right corresponding to said selected function;

g) if said desired document has attached thereto said usage right corresponding to said selected function, said repository granting access to said document; and h) if said desired document does not have attached thereto said usage right corresponding to said selected function, said repository denying access to said document.

18. The method as recited in claim 17 wherein said step of displaying a list of functions for accessing a document stored on said repository is further comprised of the steps of:

b1) displaying a list of commonly used functions; and b2) displaying an indicator to sub-lists of less frequently used functions.

19. The method as recited in claim 18 wherein said step of said user selecting a function from said displayed list of functions is further comprised of the steps of:

c1) said user traversing to said function using said traversal keys coupled to said DocuCard; and c2) said user depressing said select key on said DocuCard.

20. The method as recited in claim 19 wherein said step of said user traversing to said function using said traversal keys coupled to said DocuCard is further comprised of the steps of:

c3) said user traversing determining if said function is displayed on said DocuCard display;

c4) if said function is not displayed on said DocuCard display, said user traversing to said indicator to sub-lists of less frequently used functions;

c5) said user depressing said select key on said DocuCard; and c6) said user repeating per step c3) until said function is displayed on said DocuCard display.

21. The method as recited in claim 20 wherein said step of displaying on said display of said DocuCard a list of the contents of said repository is further comprised of the step of:

d1) displaying one or more document identifiers; and d2) displaying a proximity indicator indicating a lexical positioning of the documents displayed on said DocuCard display.

22. The method as recited in claim 21 wherein said step of said user selecting a desired document from said list of contents of said repository is further comprised of the steps of:

e1) said user traversing said list of contents using said DocuCard traversal keys until said desired document is displayed; and e2) said user depressing said select key on said DocuCard.

23. The method as recited in claim 22 where responsive to said step of said user traversing said list of contents using said DocuCard traversal keys performing the step of updating said proximity indicator indicating a lexical positioning of the documents displayed on said DocuCard display.

* * * * *